(12) United States Patent
Chandan et al.

(10) Patent No.: US 10,396,581 B2
(45) Date of Patent: Aug. 27, 2019

(54) MANAGING PEAK POWER CONSUMPTION FOR DISTRIBUTED ASSETS USING BATTERY CHARGING SCHEDULES

(71) Applicant: International Business Machines Corporation, Armonk, NY (US)

(72) Inventors: Vikas Chandan, Bangalore (IN); Pankaj Dayama, Bangalore (IN); Krishnasuri Narayanam, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 134 days.

(21) Appl. No.: 15/480,878

(22) Filed: Apr. 6, 2017

(65) Prior Publication Data

US 2018/0294665 A1   Oct. 11, 2018

(51) Int. Cl.
*H02J 7/00* (2006.01)
*G05B 19/042* (2006.01)

(52) U.S. Cl.
CPC .......... *H02J 7/0073* (2013.01); *G05B 19/042* (2013.01); *G05B 2219/25419* (2013.01)

(58) Field of Classification Search
None
See application file for complete search history.

(56) References Cited

U.S. PATENT DOCUMENTS

| | | |
|---|---|---|
| 5,701,068 A | 12/1997 | Baer et al. |
| 6,983,212 B2 | 1/2006 | Burns |
| 7,373,222 B1 * | 5/2008 | Wright ............. H02J 3/14 700/20 |
| 9,088,162 B2 | 7/2015 | Shu et al. |
| 9,477,281 B2 | 10/2016 | Varadarajan et al. |

(Continued)

FOREIGN PATENT DOCUMENTS

| | | |
|---|---|---|
| WO | 2013104765 A2 | 7/2013 |
| WO | 2014153552 A1 | 9/2014 |

OTHER PUBLICATIONS

Fang et al. Smart Grid—The New and Improved Power Grid: A Survey, 2011.

(Continued)

*Primary Examiner* — Bernard G Lindsay
(74) *Attorney, Agent, or Firm* — Ryan, Mason & Lewis, LLP (57) ABSTRACT

Methods, systems, and computer program products for managing peak power consumption for distributed assets are provided herein. A computer-implemented method includes segmenting the multiple distributed assets into groups based on energy demand behavior attributed to each of the assets and user-level constraints, wherein each of the assets is associated with one or more users, and wherein each of the users is associated with one or more organizations of the hierarchy, determining group-level constraints for each of the groups based on correlating the energy demand behavior across the users of the groups, generating a distinct battery charging schedule for each of the groups based on the determined group-level constraints, user-level objectives and organization-level objectives, and outputting the generated battery charging schedule to each of the multiple distributed assets within the hierarchy.

18 Claims, 6 Drawing Sheets

(56) References Cited

U.S. PATENT DOCUMENTS

| | | | |
|---|---|---|---|
| 2004/0103329 A1* | 5/2004 | Morisawa | G06F 1/263 713/300 |
| 2008/0015740 A1 | 1/2008 | Osann, Jr. | |
| 2011/0016063 A1 | 1/2011 | Pollack et al. | |
| 2012/0242148 A1* | 9/2012 | Galati | H02J 3/14 307/39 |
| 2013/0162037 A1* | 6/2013 | Kim | H02J 7/0068 307/24 |
| 2013/0178991 A1* | 7/2013 | Gheerardyn | G05B 13/02 700/286 |
| 2013/0184876 A1 | 7/2013 | Roshen et al. | |
| 2015/0357848 A1* | 12/2015 | Chandan | H02J 7/0052 700/296 |
| 2016/0077570 A1* | 3/2016 | Varadarajan | H02J 9/002 713/322 |
| 2016/0079787 A1* | 3/2016 | Yechieli | H02J 7/0052 320/107 |
| 2016/0141874 A1 | 5/2016 | Hunt et al. | |
| 2016/0370843 A1* | 12/2016 | Gatson | G06F 1/3234 |

OTHER PUBLICATIONS

Camacho et al. Control for Renewable Energy and Smart Grids, The Impact of Control Technology, T. Samad and A. M. Annaswamy (Eds.) 2011.

Nunna et al. Energy Management in Microgrids using Demand Response and Distributed Storage—A Multiagent Approach, IEEE Transactions on Power Delivery 28.2 (2013): 939-947.

Li et al. Optimal Demand Response Based on Utility Maximization in Power Networks, 2011 IEEE Power and Energy Society General Meeting, IEEE, 2011.

Melton, Gridwise Transactive Energy Framework (draft version). No. PNNL-SA-22946, Pacific Northwest National Laboratory (PNNL), Richland, WA (US), 2013.

* cited by examiner

MANAGING PEAK POWER CONSUMPTION FOR DISTRIBUTED ASSETS USING BATTERY CHARGING SCHEDULES

FIELD

The present application generally relates to information technology (IT), and, more particularly, to power management techniques.

BACKGROUND

If an individual connects, for example, his or her laptop connected to an alternating current (AC) supply, then the laptop draws power from the AC supply. This can occur irrespective of the amount of battery power available with the laptop. For a group of such individuals, if the charging of batteries and the source of power consumption is properly managed, the peak load (that is, the maximum AC power consumed at any time of the day) can be decreased. Similarly, if there are various distributed storage options in a facility and various load sources (AC sources, fans, lights, laptops, etc.), there can be a need for improved and/or efficient power management to reduce peak load.

Additionally, different entities may have different objectives but be related by some hierarchy (for instance, an IT park can include many companies, wherein each company has many individuals therein). Existing peak load reduction approaches in such a setting include a brute force method, implementing universal rules across the hierarchy. For example, such rules might include running each individual computer on battery power until the battery power is unavailable, at which point a switch is made to an AC power source (simultaneously recharging the battery). When the battery is fully charged, each individual computer returns to running on battery power, and this cycle is repeated.

Such a brute force method, however, does not optimize battery power usage, and problems can arise if one of the individual computers is unable to connect to the AC power source (for example, if a computer is unplugged for use in a meeting conducted at a location lacking an AC power source). Accordingly, such existing approaches can often fail to minimize the peak load in many settings.

SUMMARY

In one embodiment of the present invention, techniques for managing peak power consumption for distributed assets are provided. An exemplary computer-implemented method can include segmenting the multiple distributed assets into two or more groups based on energy demand behavior attributed to each of the assets and one or more user-level constraints, wherein each of the assets is associated with one or more users at a user-level of the hierarchy, and wherein each of the users is associated with one or more organizations at an organization-level of the hierarchy. Such a method can also include determining one or more group-level constraints for each of the two or more groups based on correlating the energy demand behavior across the users of the two or more groups, generating a distinct battery charging schedule for each of the two or more groups based on (i) the one or more determined group-level constraints, (ii) one or more user-level objectives and (iii) one or more organization-level objectives, and outputting the generated battery charging schedule to each of the multiple distributed assets within the hierarchy.

In another embodiment of the invention, an exemplary computer-implemented method can include outputting the generated battery charging schedule to (i) each of the multiple distributed assets within the hierarchy and (ii) a grid services component, and providing the grid services component access to the battery of each of the multiple distributed assets within the hierarchy, in accordance with the generated battery charging schedule of each of the assets, for management of load balance across the grid.

Another embodiment of the invention or elements thereof can be implemented in the form of a computer program product tangibly embodying computer readable instructions which, when implemented, cause a computer to carry out a plurality of method steps, as described herein. Furthermore, another embodiment of the invention or elements thereof can be implemented in the form of a system including a memory and at least one processor that is coupled to the memory and configured to perform noted method steps. Yet further, another embodiment of the invention or elements thereof can be implemented in the form of means for carrying out the method steps described herein, or elements thereof; the means can include hardware module(s) or a combination of hardware and software modules, wherein the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

DETAILED DESCRIPTION

As described herein, an embodiment of the present invention includes managing peak power consumption for distributed assets (such as electronic devices and/or devices requiring energy for operation). At least one embodiment of the invention includes effectively optimizing the objectives of multiple entities across a hierarchy (for example, IT park operators, individual organizations in the IT park, employees of the individual organizations, etc.) by managing one or more power sources over time. Such an embodiment can include segmenting users based on demand behavior to generate one or more user preference constraints, correlating demand patterns of different users to generate one or more group-level constraints, and (re-)optimizing schedules based on real-time device state information.

One or more embodiments of the invention can also be implemented in connection with grid services. For example, a prosumer can commit a certain production schedule to the grid in advance. The real-time production can deviate from the planned and committed schedule because of exogenous factors (such as wind speed fluctuations and/or cloud cover, in the case of renewable energy). Such deviations can lead to the prosumer incurring penalties, and the grid can suffer due to a mismatch in demand and supply. However, in one or more embodiments of the invention, opportunistic storage such as laptop batteries can be used to store energy when actual production exceeds planned production. The storage capacity is deterministic and, hence, the benefit provided to the grid can be quantified. The stored energy can then be used to reduce the peak load.

In accordance with one or more embodiments of the invention, an asset battery power management application can be installed on every asset (for example, every device that consumes and/or stores power) within a given hierarchy. Even when connected to an AC power source, this asset battery power management application (which can include instructions to carry out one or more steps of an example embodiment of the invention) will decide whether to draw energy from the AC power source, or to run the asset on the asset battery.

As further detailed herein, such an application can take into consideration the asset's feasibility to connect to an AC power source at different times (for example, in the case of a user's laptop, whether the user is at his or her desk (near an AC power source), or at some remote location (that is not proximate to an AC power source)), the total amount of time that the asset can run on battery power (once the battery is completely charged), the amount of time required for the battery to charge completely, the corresponding individual's movement pattern (in meetings, at a cubicle, etc.), and the expected cost function for different peak loads. In at least one embodiment of the invention, the location of the individual and/or the asset can be determined via a corresponding global positioning system (GPS) location, the Internet Protocol (IP) address connected to the user's device, using swipe-in/swipe-out details pertaining to the individual, etc.

Additionally, in at least one embodiment of the invention, such an application can carry out an optimization process in multiple stages. For example, in a first stage, using a demand forecast pattern for all assets for a given temporal period (such as a day), the application prepares the optimal schedule for charging the battery of each asset. A demand forecast pattern can be determined using the asset's calendar information (or the calendar information of the user of the asset), such as calendar details about one or more meetings or events. The demand forecast pattern can also be determined based on user's (that is, the user of the asset) preference of minimum expected percentage of battery power at any time. Such a preference can include, for example, the user not wanting to let the minimum available battery capacity go below 30% of the maximum capacity, at any time.

In a second stage, the actual time demand can be realized as the given temporal period progresses, and during a pre-determined point of the given temporal period, the optimization can be re-run. Such a stage can make use of an updated demand forecast for the rest of the given temporal period, as well as the variance of the realized demand and the forecast demand for the elapsed portion of the given temporal period.

Additionally, in one or more embodiments of the invention, fair incentives can be provided to each user based on one or more asset preferences (for example, a minimum percentage of battery power to be maintained). Such incentives can include, for example, reward points, priority charge coupons, monetary payment, etc.

Figure 1:
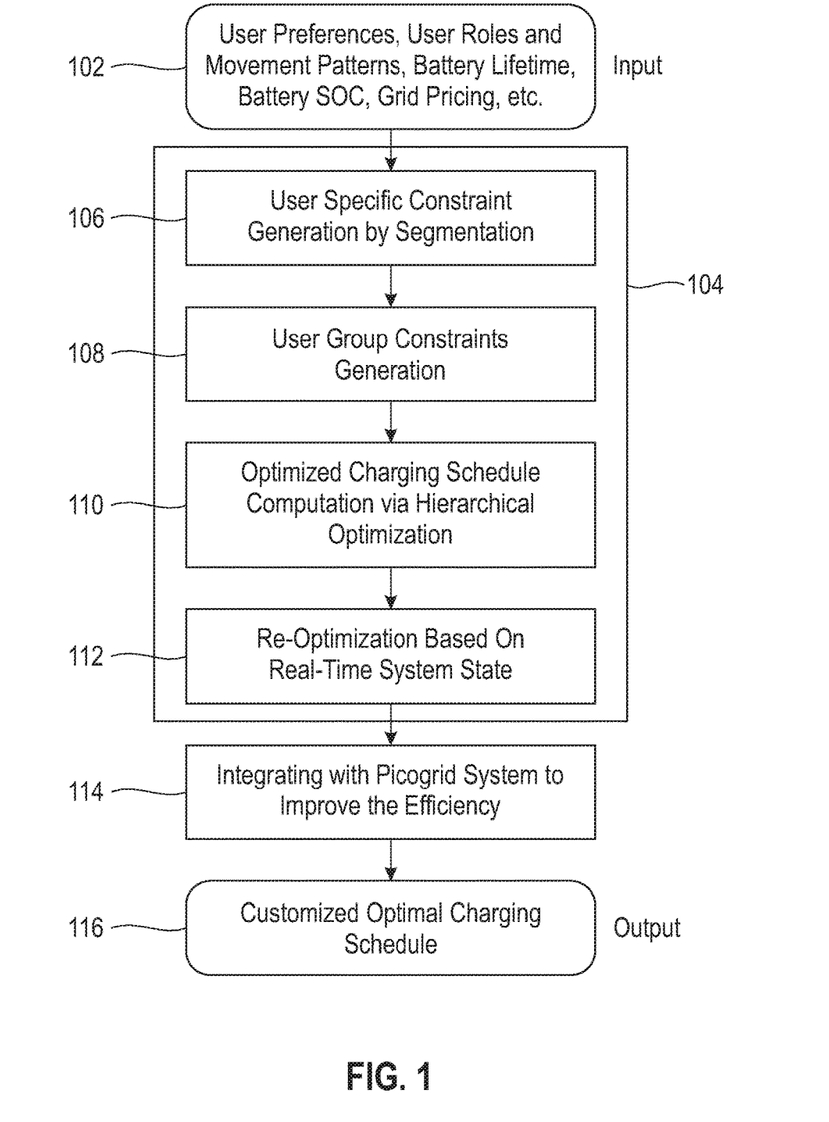
FIG. 1 is a diagram illustrating power consumption management, according to an exemplary embodiment of the invention.

FIG. 1 is a diagram illustrating power consumption management, according to an exemplary embodiment of the invention. In step 102, various inputs (user preferences, user roles and movement patterns, battery lifetime information, battery state-of-charge (SOC) information, grid pricing information, etc.) are obtained by a distributed computing application 104. In connection with the distributed computing application 104, corresponding application agents can be installed on assets (such as computing devices, mobile phones, etc.) to collect input details and send such data to a centralized server. This centralized server can subsequently compute the optimized charging schedule for the individual and/or the group of assets, and send back this information to the agents, which then facilitate implementing the optimized charging schedule for the distributed assts.

Via the computing application 104, steps 106, 108, 110 and 112 are carried out. Step 106 includes segmenting the users (within the given organization and/or the given hierarchy), based on energy demand behavior and user preference constraints, to generate user-specific constraints. Different data points that can be used in step 106 include (but are not limited to) organization information pertaining to each user, each user's requirement on the minimum battery SOC, battery lifetime variation over a period of time due to charge and discharge cycles, each user's availability at one or more pre-determined locations (based, for example, on calendar information), each user's role, movement patterns, etc. (to assist in determining if each user is available for charging the asset battery at a given time).

Step 108 includes generating user group constraints for hierarchical optimization. As used herein, "user group" constraints refers to constraints specific to a particular group of users. Users can be grouped, for example, following a time series analysis of their demand profiles (for instance, two users working on the same project could have similar demand profiles, and hence, they could be grouped together). Specifically, step 108 can include correlating energy demand patterns of different users to generate group-level constraints. In carrying out such a step, one or more embodiments of the invention can include performing a multi-variate time series analysis of demand profiles to identify cross-correlation across different user demands. Additionally, one or more group-level constraints can be generated based on such correlations. An example of a group-level constraint can include a constraint wherein if one user's asset is charged, the remaining users in that group should also have their assets charged.

Step 110 includes computing an optimized charging schedule via the hierarchical optimization. In one or more embodiments of the invention, the optimized charging schedule can be computed prior to the related power consumption (for example, a day before the power consumption) based on optimization criteria at different levels of the hierarchy. By way of example, the charging schedule can be optimized on the basis of minimizing peak load, maximizing battery lifetime, maximizing the minimum battery SOC, and/or minimizing energy costs. Additionally, computing an optimized charging schedule can include using the user preference constraints generated in step 106, the group-level constraints generated in step 108, one or more incentives and/or one or more priorities noted among the users. With respect to priorities, for example, the users falling under the top priority user group may want their demand requests to be met unconditionally, while the users falling under a lower priority user group may accept their demand requests not being met under certain circumstances (for instance, during a peak load scenario).

Also, one or more embodiments of the invention can include utilizing bounds on battery SOC (such as minimum threshold level, maximum capacity of battery, etc.), and/or energy demands following demand forecasts for different users (wherein the user's realized demand patterns do not deviate significantly from their forecasted demands).

Step 112 includes re-optimizing the charging schedule based on real-time system state information. At least one embodiment of the invention includes re-running the optimization after realizing the gaps between the demand forecast, the actual demand, and each user's ability to follow the optimized charging schedule, so as to improve the optimized charging schedule for the rest of the given temporal period.

Additionally, step 114 includes integrating the output of the optimized charging schedule 116 with a picogrid system to improve efficiency of the system. In one or more embodiments of the invention, the available stored energy can be provided on a picogrid system to improve efficiency. Such an embodiment enables central coordination and management of the resources of the picogrid. As used herein, a direct current (DC) picogrid can include a combination of local energy storage (such as batteries, which may be included with a computing device, such as a laptop) and personal DC appliances such as light-emitting diode lights and/or DC fans. Also, in such a setting, the DC appliances can be powered by a computing device battery when there is a grid power outage and a backup source is otherwise providing electricity.

As detailed herein, at least one embodiment of the invention can include computing an optimized charging schedule based on optimization criteria at different levels of a given hierarchy. By way of example, consider a scenario wherein multiple organizations are present in an IT campus/business park. The objective(s) of the team managing the operations of the IT campus may not align with the objective(s) of the individual organizations therein. For instance, the IT campus operations team may want to minimize the peak load of the campus (as they may need to buy at a disadvantageous market position in the case of peak load violations and/or demand overshooting the substation capacity). Moreover, each organization may have different objectives. For instance, an objective may include maximizing the battery life in one or more organizations wherein the employees own their laptops, and/or an objective may include maximizing the minimum battery SOC in organizations who lease laptops. Further, each organization may have additional terms in an objective function, such as minimizing the total energy cost.

Additionally, in furtherance of the above example, construction of a hierarchical optimization model can include an IT-campus level (top-level) optimization. At each interval over the scheduling horizon, the users' energy demand forecast is used to generate the cumulative demand for each organization. Similarly, the cumulative storage available at each interval for each organization can be estimated. This cumulative storage amount can be computed by subtracting the used energy from the available total storage across an organization, at regular intervals. Additionally, the charging schedule for each organization, minimizing the peak load at the campus level, and under the storage constraints, can be generated.

Also, an individual organization-level (bottom-level) optimization can be generated to produce customized user charging schedules. Such an optimization can include minimizing energy cost and maximizing battery life (or maximizing the minimum battery SOC). At each interval, the users' cumulative demand equals the demand for the given organization as used in the top-level optimization. Also, at each interval, the users' cumulative storage equals the storage for the given organization as used in the top-level optimization. Further, in generating the bottom-level optimization, one or more user preference constraints, one or more group-level constraints, one or more incentives, and/or one or more priorities among the users can be used.

Figure 2:
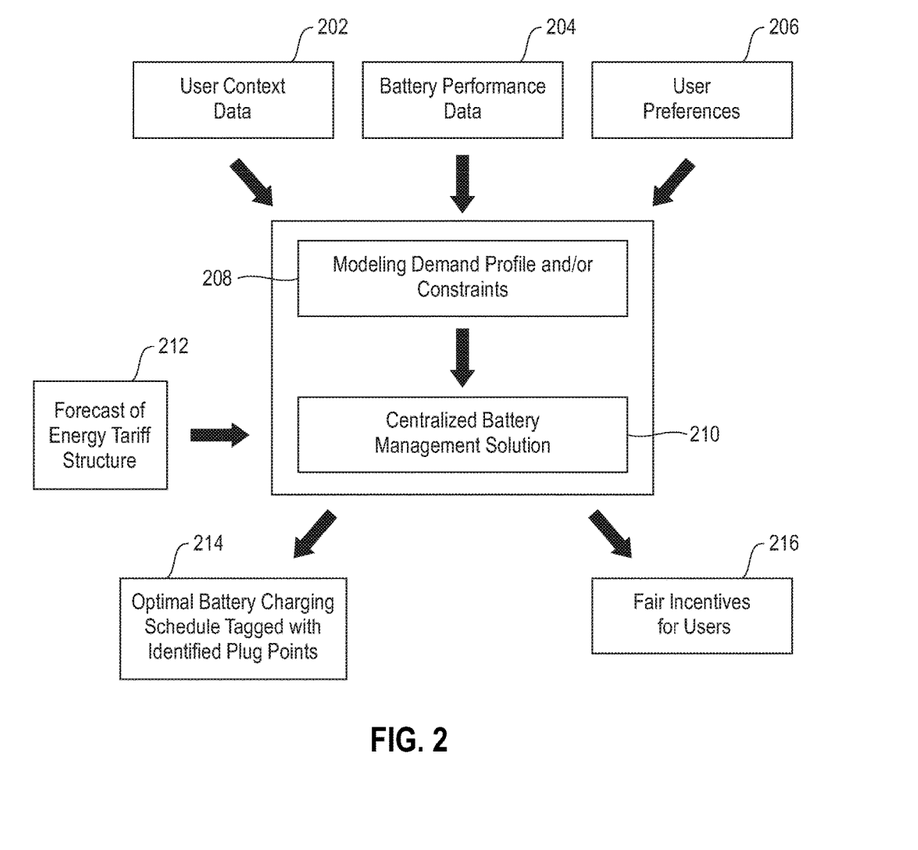
FIG. 2 is a diagram illustrating system architecture, according to an exemplary embodiment of the invention.

FIG. 2 is a diagram illustrating system architecture, according to an exemplary embodiment of the invention. By way of illustration, FIG. 2 depicts inputs of user context data 202 (such as a demand profile for each user), battery performance data 204 (such as the current SOC for each battery), and one or more user preferences 206, which are provided to and/or obtained by a demand profile and/or constraint modeling component 208. Modeling component 208, based on such inputs, provides an output (for example, user-specific constraints, user-group specific constraints, etc.) to a centralized battery management solution component 210, which also receives an input of forecasts of one or more energy tariffs 212. The solution component, based on these inputs, generates an optimal battery charging schedule 214 tagged with identified plug points (also referred to as charging sockets) and one or more fair incentives for the users 216. Such fair incentives 216 can be based on levels of user selected preferences, user profiles and usage of prioritized services. Such levels of user selected preferences can represent, for example, that a user has hard constraints in terms of meeting the energy demand at any point in time, a user accepts energy demands not being met at some point in time, a minimum battery charge that the user wants to maintain for a laptop, etc.

The optimal and/or optimized battery charging schedule 214 can include a multi-level optimization of the objectives of multiple entities, considering their hierarchy, by generating user-specific constraints and group-level constraints through user segmentation and correlation of demand patterns of different users. Additionally, as detailed herein, one or more embodiments of the invention can include generating a re-optimization of the charging schedule based on any deviation observed in real-time demand data from demand profiles used for the initial charging schedule.

By way of example, consider an embodiment of the invention wherein an objective includes minimizing $w_1$*(peak load)+$w_2$*(battery lifetime impact)+$w_3$* (energy cost). In such an example embodiment, one or more constraints can include a battery dynamics constraint, an integer constraint, a demand constraint, a safety and/or performance constraint, a battery life enhancement constraint, a user-specific constraint, and/or a priority constraint.

A battery dynamics constraint can include, for example, $SOC_i(k+1)=\max(SOC_i(k)+u_i(k)W_{i,ch}(k)\Delta T-(1-u_i(k))W_{i,dch}(k)\Delta T, SOC_{i,max})$, wherein $W_i(k)=u_i(k)(W_{i,ch}(k)+W_{i,dch}(k))$. As used above, $SOC_i(k)$ represents the state of charge of asset/battery i at time k; $u_i(k)$ represents that the battery of user i cannot be charged during interval k; $W_{i,ch}(k)\Delta T$ represents the increase in battery capacity in watt-hours (Wh) in charging time $\Delta T$; $W_{i,dch}(k)\Delta T$ represents the decrease in battery capacity in watt-hours (Wh) in discharging time $\Delta T$; and $SOC_{i,max}$ represents the maximum possible battery state of charge. An integer constraint can include, for example, $u_i(k) \in \{0, 1\}$. Also, a demand constraint (D) can include, for example, $SOC_i(k) > D_i(k)$. A safety and/or performance constraint can, for example, impose a minimum "time to death" constraint such as $$\frac{SOC_i(k)}{W_{i,dch}(k)} \geq TTD_{min}.$$

Additionally, a battery life enhancement constraint can require that a battery SOC be maintained between certain thresholds, such as, for example, $SOC_{i,LB} < SOC_i(k+1) < SOC_{i,UB}$, wherein LB refers to the lower bound on the battery SOC, and wherein UB refers to the upper bound on the battery SOC. A user-specific constraint can, for example, relate to a user in a meeting, with no access to charging, and can be represented as $u_i(k)=0$ (battery cannot be charged). Further, a priority constraint can require, for example, if the priority of user i>the priority of user j, assigning $u_i(k) \geq u_j(k)$ if $SOC_i(k) \geq SOC_j(k) - \tau$, wherein $\tau$ is an SOC threshold.

As noted herein, one or more embodiments of the invention can include computing one or more fair incentives. Specifically, such an embodiment can include using one or more user preferences for various parameters (such as, for example, minimum SOC) to generate one or more incentives offered to each user (for example, reward points, priority charge coupons, monetary payment, etc.). In computing incentives, consider the following illustrative example. Let $T_i$ represent the minimum SOC threshold set by user i. Let $T=\min(T_1, T_2, \ldots, T_n)$. For each user i, one or more embodiments of the invention can also include computing an additional peak load reduction if user i sets threshold $T_i$ as against T. Such an additional peak load reduction can be referred to, for example, as $X_i$. Also, let G be the total gain achieved by the integrated battery charge management system. Further, an incentive to user i can be proportional to $X_i/\text{sum}_j X_j$.

Figure 3:
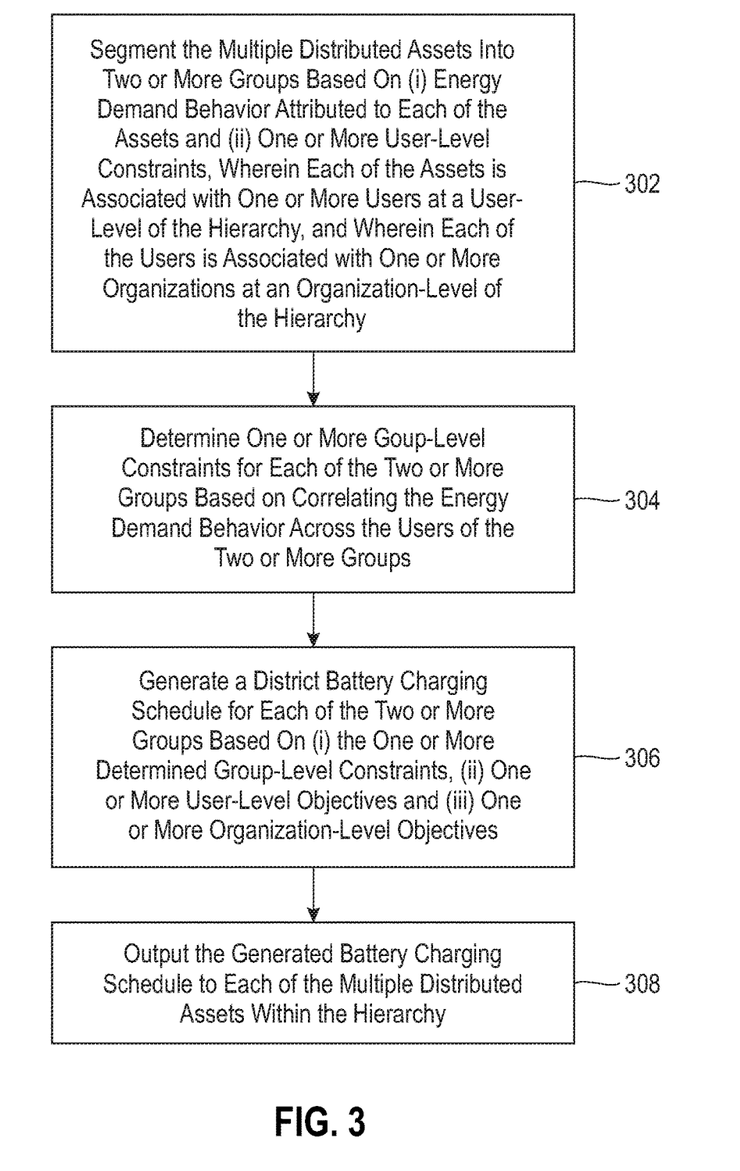
FIG. 3 is a flow diagram illustrating techniques according to an embodiment of the invention.

FIG. 3 is a flow diagram illustrating techniques according to an embodiment of the present invention. Step 302 includes segmenting the multiple distributed assets into two or more groups based on (i) energy demand behavior attributed to each of the assets and (ii) one or more user-level constraints, wherein each of the assets is associated with one or more users at a user-level of the hierarchy, and wherein each of the users is associated with one or more organizations at an organization-level of the hierarchy. The user-level constraints can include information pertaining to the organization with which each user is associated, one or more user requirements pertaining to a minimum battery state of charge for one or more of the assets, information pertaining to battery lifetime for one or more of the assets, availability information pertaining to one or more of the users, information pertaining to each user's role within one or more of the organizations, one or more movement patterns attributed to one or more of the users, and/or one or more user priority constraints.

Step 304 includes determining one or more group-level constraints for each of the two or more groups based on correlating the energy demand behavior across the users of the two or more groups. Such a correlating step can include performing a multi-variate time series analysis of the energy demand behavior across the users of the two or more groups to identify one or more cross correlations across the users of the two or more groups.

Step 306 includes generating a distinct battery charging schedule for each of the two or more groups based on (i) the one or more determined group-level constraints, (ii) one or more user-level objectives and (iii) one or more organization-level objectives. The user-level objectives can include increasing battery lifetime for one or more of the assets and/or increasing the minimum battery state of charge for one or more of the assets. The organization-level objectives can include reducing peak load, increasing battery lifetime for one or more of the assets, reducing energy costs, and/or increasing the minimum battery state of charge for one or more of the assets.

Step 308 includes outputting the generated battery charging schedule to each of the multiple distributed assets within the hierarchy.

The techniques depicted in FIG. 3 can also include generating an updated battery charging schedule for each of the two or more groups based on any deviation between (i) observed real-time demand data and (ii) the energy demand behavior attributed to each of the assets, and outputting the updated battery charging schedule to each of the multiple distributed assets within the hierarchy. Further, the techniques depicted in FIG. 3 can also include generating one or more incentives for one or more of the users based on (i) one or more user preferences and (ii) usage of one or more prioritized services attributed to the one or more users.

Also, an additional embodiment of the invention includes outputting the generated battery charging schedule to (i) each of the multiple distributed assets within the hierarchy and (ii) a grid services component, and providing the grid services component access to the battery of each of the multiple distributed assets within the hierarchy, in accordance with the generated battery charging schedule of each of the assets, for management of load balance across the grid.

The techniques depicted in FIG. 3 can also, as described herein, include providing a system, wherein the system includes distinct software modules, each of the distinct software modules being embodied on a tangible computer-readable recordable storage medium. All of the modules (or any subset thereof) can be on the same medium, or each can be on a different medium, for example. The modules can include any or all of the components shown in the figures and/or described herein. In an embodiment of the invention, the modules can run, for example, on a hardware processor. The method steps can then be carried out using the distinct software modules of the system, as described above, executing on a hardware processor. Further, a computer program product can include a tangible computer-readable recordable storage medium with code adapted to be executed to carry out at least one method step described herein, including the provision of the system with the distinct software modules.

Additionally, the techniques depicted in FIG. 3 can be implemented via a computer program product that can include computer useable program code that is stored in a computer readable storage medium in a data processing system, and wherein the computer useable program code was downloaded over a network from a remote data processing system. Also, in an embodiment of the invention, the computer program product can include computer useable program code that is stored in a computer readable storage medium in a server data processing system, and wherein the computer useable program code is downloaded over a network to a remote data processing system for use in a computer readable storage medium with the remote system.

An embodiment of the invention or elements thereof can be implemented in the form of an apparatus including a memory and at least one processor that is coupled to the memory and configured to perform exemplary method steps.

Figure 4:
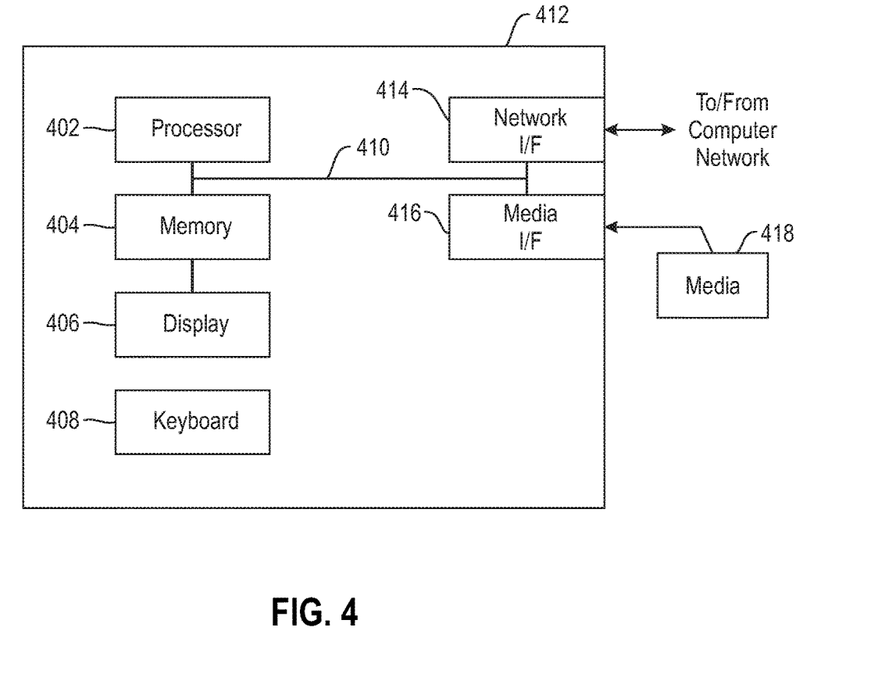
FIG. 4 is a system diagram of an exemplary computer system on which at least one embodiment of the invention can be implemented.

Additionally, an embodiment of the present invention can make use of software running on a computer or workstation. With reference to FIG. 4, such an implementation might employ, for example, a processor 402, a memory 404, and an input/output interface formed, for example, by a display 406 and a keyboard 408. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, a mechanism for inputting data to the processing unit (for example, mouse), and a mechanism for providing results associated with the processing unit (for example, printer). The processor 402, memory 404, and input/output interface such as display 406 and keyboard 408 can be interconnected, for example, via bus 410 as part of a data processing unit 412. Suitable interconnections, for example via bus 410, can also be provided to a network interface 414, such as a network card, which can be provided to interface with a computer network, and to a media interface 416, such as a diskette or CD-ROM drive, which can be provided to interface with media 418.

Accordingly, computer software including instructions or code for performing the methodologies of the invention, as described herein, may be stored in associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 402 coupled directly or indirectly to memory elements 404 through a system bus 410. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including, but not limited to, keyboards 408, displays 406, pointing devices, and the like) can be coupled to the system either directly (such as via bus 410) or through intervening I/O controllers (omitted for clarity).

Network adapters such as network interface 414 may also be coupled to the system to enable the data processing system to become coupled to other data processing systems or remote printers or storage devices through intervening private or public networks. Modems, cable modems and Ethernet cards are just a few of the currently available types of network adapters.

As used herein, including the claims, a "server" includes a physical data processing system (for example, system 412 as shown in FIG. 4) running a server program. It will be understood that such a physical server may or may not include a display and keyboard.

The present invention may be a system, a method, and/or a computer program product at any possible technical detail level of integration. The computer program product may include a computer readable storage medium (or media) having computer readable program instructions thereon for causing a processor to carry out embodiments of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform embodiments of the present invention.

Embodiments of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It should be noted that any of the methods described herein can include an additional step of providing a system comprising distinct software modules embodied on a computer readable storage medium; the modules can include, for example, any or all of the components detailed herein. The method steps can then be carried out using the distinct software modules and/or sub-modules of the system, as described above, executing on a hardware processor 402. Further, a computer program product can include a computer-readable storage medium with code adapted to be implemented to carry out at least one method step described herein, including the provision of the system with the distinct software modules.

In any case, it should be understood that the components illustrated herein may be implemented in various forms of hardware, software, or combinations thereof, for example, application specific integrated circuit(s) (ASICS), functional circuitry, an appropriately programmed digital computer with associated memory, and the like. Given the teachings of the invention provided herein, one of ordinary skill in the related art will be able to contemplate other implementations of the components of the invention.

Additionally, it is understood in advance that implementation of the teachings recited herein are not limited to a particular computing environment. Rather, embodiments of the present invention are capable of being implemented in conjunction with any type of computing environment now known or later developed.

For example, cloud computing is a model of service delivery for enabling convenient, on-demand network access to a shared pool of configurable computing resources (for example, networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (for example, country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (for example, storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (for example, web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (for example, host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (for example, mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (for example, cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
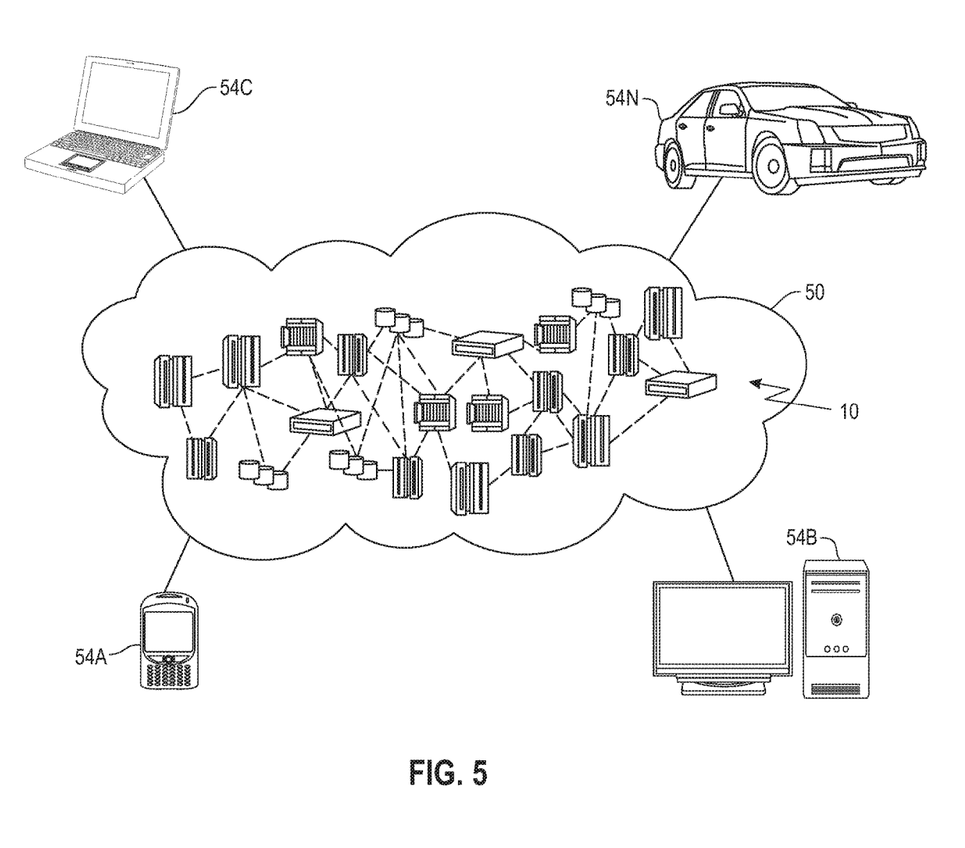
FIG. 5 depicts a cloud computing environment according to an embodiment of the present invention.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
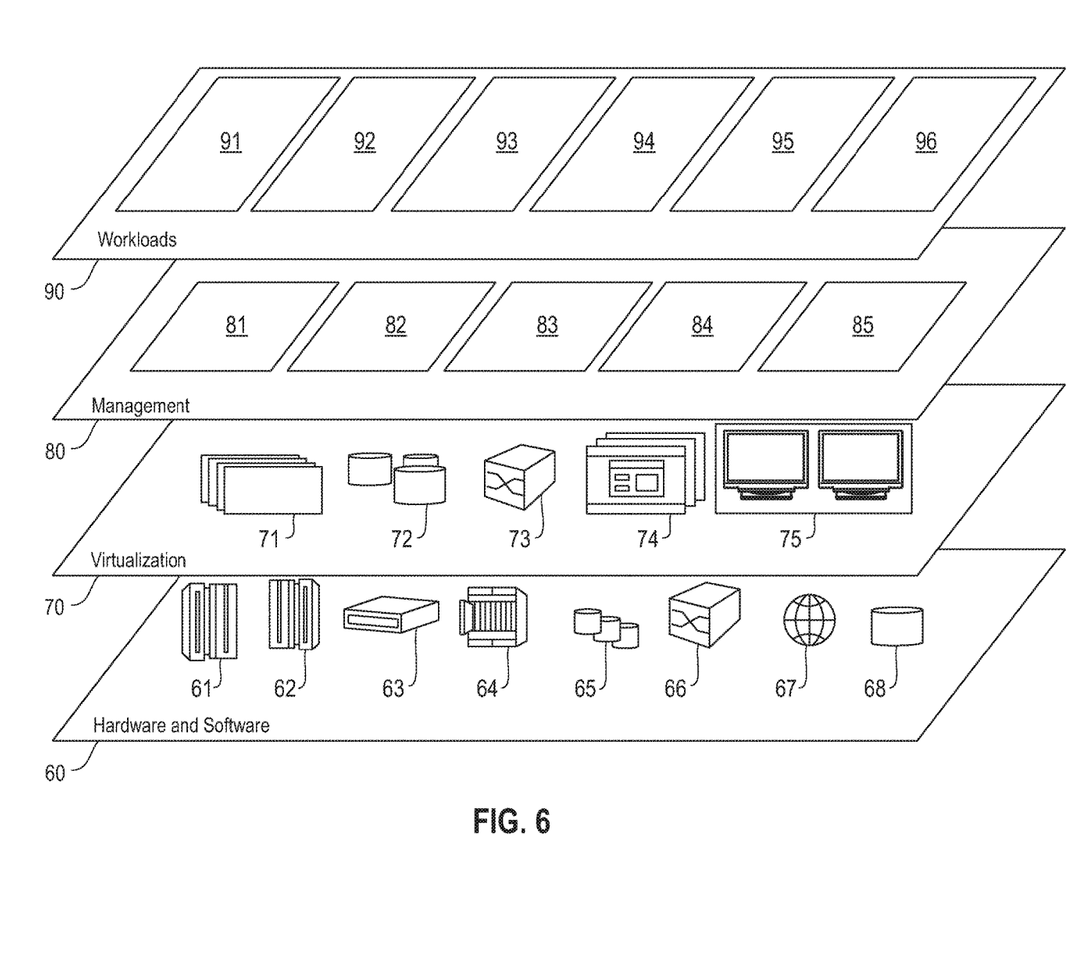
FIG. 6 depicts abstraction model layers according to an embodiment of the present invention.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75. In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources.

In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and peak load reduction 96, in accordance with the one or more embodiments of the present invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of another feature, step, operation, element, component, and/or group thereof.

At least one embodiment of the present invention may provide a beneficial effect such as, for example, segmenting users based on organization information, and correlating energy demand patterns of different users working on same project and with the same preferences to generate user group-level constraints for optimizing charging schedules at different levels of hierarchy.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for generating a battery charging schedule for multiple distributed assets within a hierarchy, the method comprising steps of:
    segmenting the multiple distributed assets into two or more groups based on (i) energy demand behavior attributed to each of the assets and (ii) one or more user-level constraints, wherein each of the assets is associated with one or more users at a user-level of the hierarchy, and wherein each of the users is associated with one or more organizations at an organization-level of the hierarchy;
    determining one or more group-level constraints for each of the two or more groups based on correlating the energy demand behavior across the users of the two or more groups, wherein said correlating comprises performing a multi-variate time series analysis of the energy demand behavior across the users of the two or more groups to identify one or more cross correlations across the user energy demands of the two or more groups;
    generating a distinct battery charging schedule for each of the two or more groups based on (i) the one or more determined group-level constraints, (ii) one or more user-level objectives and (iii) one or more organization-level objectives;
    outputting the generated battery charging schedule to (i) each of the multiple distributed assets within the hierarchy and (ii) a grid services component associated with a grid;
    managing the multiple distributed assets within the hierarchy in accordance with the generated battery charging schedule; and
    providing the grid services component access to the battery of each of the multiple distributed assets within the hierarchy, in accordance with the generated battery charging schedule of each of the multiple distributed assets, to manage load balance across the grid;
    wherein the steps are carried out by at least one computing device.

2. The computer-implemented method of claim 1, comprising:
    generating an updated battery charging schedule for each of the two or more groups based on any deviation between (i) observed real-time demand data and (ii) the energy demand behavior attributed to each of the assets; and
    outputting the updated battery charging schedule to each of the multiple distributed assets within the hierarchy.

3. The computer-implemented method of claim 1, comprising:
    generating one or more incentives for one or more of the users based on (i) one or more user preferences and (ii) usage of one or more prioritized services attributed to the one or more users.

4. The computer-implemented method of claim 1, wherein the one or more user-level constraints comprises information pertaining to the organization with which each user is associated.

5. The computer-implemented method of claim 1, wherein the one or more user-level constraints comprise one or more user requirements pertaining to a minimum battery state of charge for one or more of the assets.

6. The computer-implemented method of claim 1, wherein the one or more user-level constraints comprises information pertaining to battery lifetime for one or more of the assets.

7. The computer-implemented method of claim 1, wherein the one or more user-level constraints comprises availability information pertaining to one or more of the users.

8. The computer-implemented method of claim 1, wherein the one or more user-level constraints comprises information pertaining to each user's role within one or more of the organizations.

9. The computer-implemented method of claim 1, wherein the one or more user-level constraints comprises one or more movement patterns attributed to one or more of the users.

10. The computer-implemented method of claim 1, wherein the one or more user-level constraints comprise one or more user priority constraints.

11. The computer-implemented method of claim 1, wherein the one or more user-level objectives comprises optimizing battery lifetime for one or more of the assets.

12. The computer-implemented method of claim 1, wherein the one or more user-level objectives comprises optimizing the minimum battery state of charge for one or more of the assets.

13. The computer-implemented method of claim 1, wherein the one or more organization-level objectives comprises reducing peak load.

14. The computer-implemented method of claim 1, wherein the one or more organization-level objectives comprises optimizing battery lifetime for one or more of the assets.

15. The computer-implemented method of claim 1, wherein the one or more organization-level objectives comprises reducing energy costs.

16. The computer-implemented method of claim 1, wherein the one or more organization-level objectives comprises optimizing the minimum battery state of charge for one or more of the assets.

17. A computer program product comprising a non-transitory computer readable storage medium having program instructions embodied therewith, the program instructions executable by a device to cause the device to:
    segment multiple distributed assets into two or more groups based on (i) energy demand behavior attributed to each of the assets and (ii) one or more user-level constraints, wherein each of the assets is associated with one or more users at a user-level of the hierarchy, and wherein each of the users is associated with one or more organizations at an organization-level of the hierarchy;
    determine one or more group-level constraints for each of the two or more groups based on correlating the energy demand behavior across the users of the two or more groups, wherein said correlating comprises performing a multi-variate time series analysis of the energy demand behavior across the users of the two or more groups to identify one or more cross correlations across the user energy demands of the two or more groups;
    generate a distinct battery charging schedule for each of the two or more groups based on (i) the one or more determined group-level constraints, (ii) one or more user-level objectives and (iii) one or more organization-level objectives;

output the generated battery charging schedule to (i) each of the multiple distributed assets within the hierarchy and (ii) a grid services component associated with a grid;

manage the multiple distributed assets within the hierarchy in accordance with the generated battery charging schedule; and provide the grid services component access to the battery of each of the multiple distributed assets within the hierarchy, in accordance with the generated battery charging schedule of each of the multiple distributed assets, to manage load balance across the grid.

18. A system comprising:

a memory; and at least one processor operably coupled to the memory and configured for:

segmenting multiple distributed assets into two or more groups based on (i) energy demand behavior attributed to each of the assets and (ii) one or more user-level constraints, wherein each of the assets is associated with one or more users at a user-level of the hierarchy, and wherein each of the users is associated with one or more organizations at an organization-level of the hierarchy;

determining one or more group-level constraints for each of the two or more groups based on correlating the energy demand behavior across the users of the two or more groups, wherein said correlating comprises performing a multi-variate time series analysis of the energy demand behavior across the users of the two or more groups to identify one or more cross correlations across the user energy demands of the two or more groups;

generating a distinct battery charging schedule for each of the two or more groups based on (i) the one or more determined group-level constraints, (ii) one or more user-level objectives and (iii) one or more organization-level objectives;

outputting the generated battery charging schedule to (i) each of the multiple distributed assets within the hierarchy and (ii) a grid services component associated with a grid;

managing the multiple distributed assets within the hierarchy in accordance with the generated battery charging schedule; and providing the grid services component access to the battery of each of the multiple distributed assets within the hierarchy, in accordance with the generated battery charging schedule of each of the multiple distributed assets, to manage load balance across the grid.

* * * * *